No. 624,992.  
J. A. SWINEHART.  
RUBBER TIRE FOR VEHICLE WHEELS.  
(Application filed Mar. 13, 1899.)  
Patented May 16, 1899.
(No Model.)
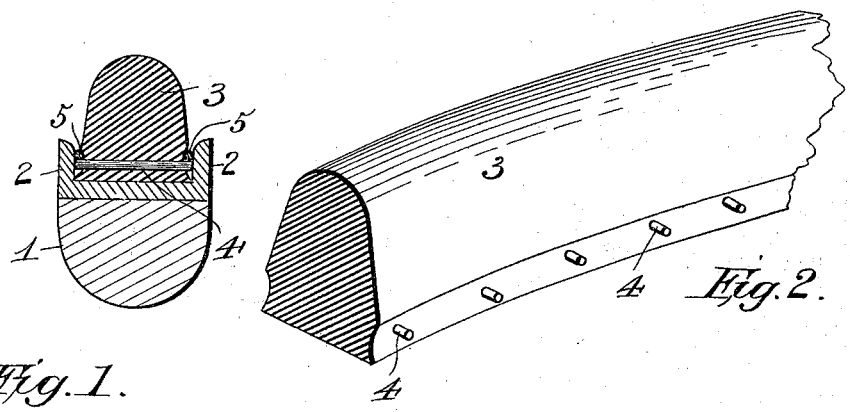
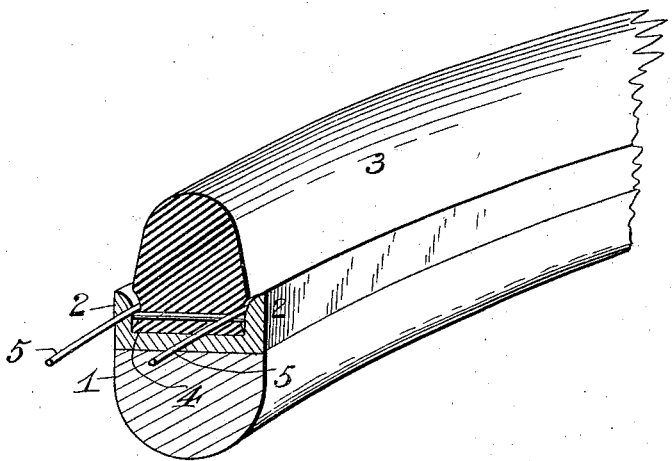
Fig. 3.
WITNESSES:  
F. L. Durand  
INVENTOR:  
James A. Swinehart  
By Bagger & Co.,  
ATTORNEYS.
THE NORRIS PETERS CO., PHOTO-LITHO., WASHINGTON, D. C.

United States Patent Office.

JAMES A. SWINEHART, OF AKRON, OHIO.

RUBBER TIRE FOR VEHICLE-WHEELS.

SPECIFICATION forming part of Letters Patent No. 624,992, dated May 16, 1899.

Application filed March 13, 1899. Serial No. 708,917. (No model.)

*To all whom it may concern:*

Be it known that I, JAMES A. SWINEHART, a citizen of the United States, residing at Akron, in the county of Summit and State of Ohio, have invented new and useful Improvements in Rubber Tires for Vehicles and Means for Retaining the Same, of which the following is a specification.

My invention relates to solid-rubber or cushion tires for wheels; and its object is to provide improved means whereby the tires can be securely connected with the wheel-rims, but can be readily disconnected therefrom when desired or necessary. It is also an object to so construct the tire that it may be given a coil shape, so that the tread is contracted when put on the wheel, making it more durable.

The invention consists, essentially, in the combination, with the rim of a wheel having outwardly-extending peripheral flanges at the sides, of a solid or cushion tire of rubber provided on the inner side with transverse metal bars and with wires extending around the rim and engaging with the ends of said bars, as hereinafter fully described and claimed.

In the accompanying drawings, Figure 1 is a transverse sectional view of so much of a wheel as is necessary to illustrate my invention. Fig. 2 is a detail perspective view showing the bars secured to the inner side of the tire. Fig. 3 is a detail perspective view showing the tire in place on the wheel-rim and also showing the wires for holding it in place.

In the said drawings the reference-numeral 1 designates the tire of a wagon-wheel of any ordinary or suitable construction and provided at each side with an outwardly-extending peripheral flange 2.

The numeral 3 designates the solid-rubber tire having a flat inner side, to which is secured a number of transverse metal plates 4, which are preferably connected with the tire when the same is vulcanized, although this is not essential. The construction of this tire and the bars is such that when the tire is compressed the bars will project beyond the sides thereof. The numeral 5 designates two wires extending entirely around the wheel-rim and resting against the ends of the said bars. The ends of these wires are connected together in any suitable manner or may be secured to the flanges of the rim, so long as they constitute practically endless bands bearing on the bars.

In connecting the tire with the rim the former is sprung between the flanges of the latter, as usual, compressing the tire above or outside of the transverse metal bars, so that they project beyond the sides of the same. The wires are then carried around the rim and forced between the tire and the flanges 2 of the rim. The ends of the wires are now connected together, forming endless bands which press against the ends of the bars and securely hold the tire in place on the rim. By disconnecting the ends of the wires the tire can be readily removed or disconnected from the rim when desired or necessary.

Having thus fully described my invention, what I claim is—

The combination with a wheel-tire having outwardly-extending flanges at each side, of the solid-rubber tire provided with metal bars at the inner side, and the endless wires passing around said tire and bearing against the projecting ends of said bars, substantially as described.

In testimony whereof I have hereunto set my hand in presence of two subscribing witnesses.

JAMES A. SWINEHART.

Witnesses:
G. W. GRIDLEY,
NATHAN MORSE.